Figure 2:
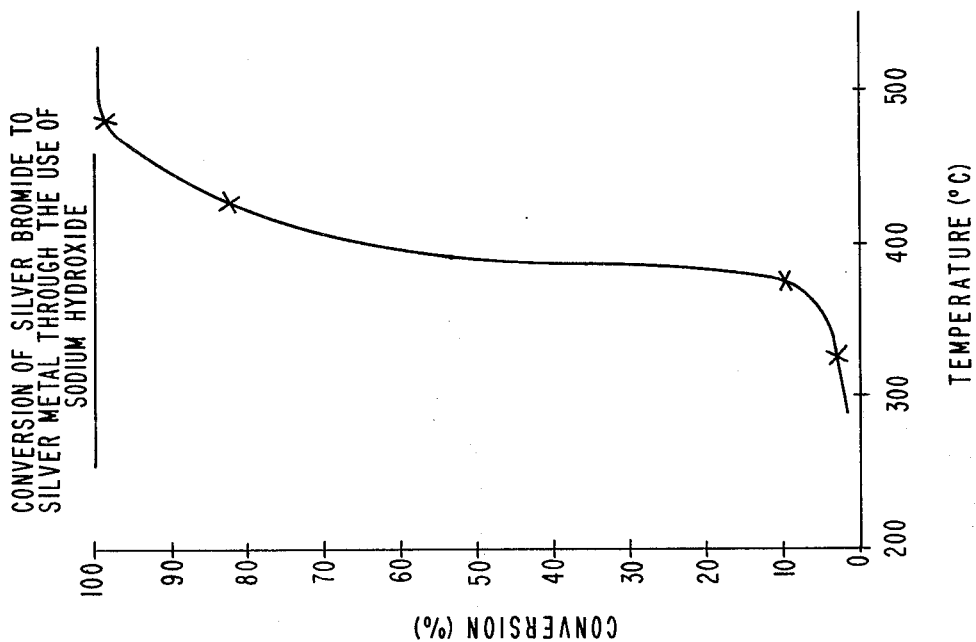

United States Patent [19]

Moynahan et al.

[11] 3,929,466

[45] Dec. 30, 1975

[54] RECOVERY OF SILVER FROM SILVER SALTS

[75] Inventors: Edward B. Moynahan; August H. Brunner, Jr., both of Binghamton; Gerald R. Skreckoski, Apalachin, all of N.Y.

[73] Assignee: GAF Corporation, New York, N.Y.

[22] Filed: June 28, 1974

[21] Appl. No.: 484,349

[52] U.S. Cl. ............................... 75/83; 75/118 P
[51] Int. Cl.² ................................ C22B 11/00
[58] Field of Search ............... 75/83, 90, 118 P

[56] References Cited
UNITED STATES PATENTS

| | | | |
|---|---|---|---|
| 1,545,032 | 7/1925 | Born | 75/118 P |
| 2,131,045 | 9/1938 | Hickman et al. | 75/83 |
| 2,131,072 | 9/1938 | Reid | 75/83 |
| 2,218,250 | 10/1940 | Reid | 75/83 |
| 3,594,157 | 7/1971 | Hendrickson et al. | 75/83 |
| 3,632,336 | 1/1972 | Cameron | 75/83 |
| 3,660,079 | 5/1972 | Govani | 75/83 |
| 3,671,222 | 6/1972 | Johnson | 75/83 |
| 3,748,123 | 7/1971 | Bakker | 75/118 P |

*Primary Examiner*—M. J. Andrews
*Attorney, Agent, or Firm*—Walter C. Kehm

[57] ABSTRACT

A method of converting a silver salt to metallic silver, which comprises heating, to a temperature of at least about 300°C but below the melting point of silver, an admixture comprising a silver salt and an oxygen-containing alkali metal compound that will react with said silver salt at said temperature to form silver metal, for a period of time at least sufficient to convert said silver salt to metallic silver, said temperature being sufficient to initiate said conversion.

30 Claims, 2 Drawing Figures

RECOVERY OF SILVER FROM SILVER SALTS

This invention relates to a new process for the recovery of precious metals, such as metallic silver, from scrap materials, and particularly from scrap materials in which substantial proportions of the metal are in the form of salts, such as in photographic emulsion scrap materials.

Scrap photographic emulsion materials from the photographic industry take a number of forms, including batches of photographic emulsion which are separated from, or which never have been combined with, a film or paper base, unexposed emulsion on a film or paper base, and exposed emulsion on a film or paper base. In addition, various waste solutions are also valuable sources from which silver may be recovered, such as spent fixing baths and wash liquids. The most valuable constituents of these scrap materials are usually the silver and the film base material.

The most common method for recovery of the silver from scrap emulsion is simply to burn the scrap emulsion in a furnace. The residue ash left from the burning contains the silver, which may be finally recovered in a silver smelter. The smelting step involves heating with a chemical flux to reduce the silver salts to silver metal and to remove the undesired impurities as a slag. This process has a number of serious problems and disadvantages. For instance, the film base or paper support consisting of hydrocarbons or cellulose materials can represent as much as 80% by weight of the total mass and the burning of this material causes considerable air pollution. Furthermore, uncontrolled burning results in as much as a 10 to 20% loss of silver by volatilization of the silver salts. Elaborate and costly methods have been used frequently to attempt to minimize these losses and reduce pollution.

The recovery of silver from waste solutions involves recovery of silver-bearing solids from the solution followed by any one of several processes, such as smelting.

It is an object of the present invention to provide an improved method for salvaging photographic scrap materials in which the step of burning the film base and paper base materials is avoided completely while at the same time permitting recovery of the film or paper base for recycling.

It is another object of the present invention to provide an improved method for salvaging silver from photographic scrap emulsion materials, which is capable of obtaining virtually quantitative yields of silver in a purity high enough to be directly used in the photographic industry.

It is another object of this invention to provide an improved method for salvaging silver from photographic scrap materials at lower temperatures than were heretofore used, thus reducing losses and minimizing air pollution.

It is another object of this invention to avoid the use of metals, such as iron, zinc, cadmium, aluminum or magnesium, in the recovery process, to thus avoid resultant contamination of the recovered silver and/or the costly procedures needed to remove these metals from the effluent.

These objects are accomplished by the process of the present invention, which comprises heating, to a temperature of at least about 300°C but below the melting point of silver, an admixture comprising a silver salt and an oxygen-containing alkali metal compound that will react with said silver salt at said temperature to form silver metal, for a period of time at least sufficient to convert said silver salt to metallic silver, said temperature being sufficient to initiate said conversion. The silver thus formed may be recovered by raising the temperature of the reaction mass to a temperature at least equal to the melting point of silver to melt silver, and recovering said molten silver.

The present invention is based on our discovery that silver salts apparently undergo a low temperature, metathetical conversion to metallic silver when heated below the melting point of silver with a compound such as alkali metal carbonate or hydroxide. Quite unexpectedly, it has been found that this reaction can give quantitative yields of silver metal with exceptionally high purity. Furthermore, since the temperatures employed are below the melting point of silver, loss of silver by volatilization of silver salts encountered at high temperatures is minimized.

The use of a flux in the smelting of silver-bearing wastes is well known. In such reactions, the charge is heated above the melting point of the silver, and the flux acts as a scavenger for impurities. See, for example, U.S. Pat. No. 2,218,250 wherein it is proposed to smelt a mixture of silver-bearing salts with a flux containing sodium carbonate, borax and silica, at a temperature above 2300°F. (1093°C), for ½ to 3 hours. Belgian Pat. No. 801,136 also employs a molten flux, such as sodium carbonate, maintained at a temperature above the melting point of the metal to be recovered, as a means of recovering metals from scrap. Mellor's *Treatise On Inorganic And Theoretical Chemistry*, J. W. Mellor, Volume III, Longmans, Green and Co., 1946, at pages 308, 314 and 342, discusses several fusion reactions between silver chloride and alkali metal carbonate. See also Handbuch Der Preparativen Chemie, L. Vanino, Verlag Von Ferdinand Enke, Stuttgart, 1925, p.521.

In the present invention, the sodium carbonate is a reactant, not merely a scavenger for impurities, and, in addition, pure silver metal is formed below the melting point of silver.

The reaction mechanism of the present invention is manifested by observable changes in the reaction mass during the course of the reaction, and on the basis of these observations certain conclusions can be drawn. Thus, in a typical case where the present invention is employed to recover silver from a solid mass containing silver salts and organic material, a mixture of the solids and sodium carbonate is charged to a crucible and heated to a temperature of about 500° to about 600°C, during which time organic material is burned off, as evidenced by carbonaceous residues being formed and heavy black smoke emanating from the oven. After the cessation of the black smoke, observation of the reaction mass shows mossy silver starting to form on the surface of the charge, which indicates that the metathetical reaction occurred to form some solid metallic silver. When the charge is returned to the oven and heated to about 700°C, the surface of the charge becomes covered with silver. At about 800°C, there is an observable shrinking of the charge and the starting of bubbling, presumably due to the decomposing of the sodium carbonate. Between about 800° and about 900°C, there is evidence of a more rapid reaction, accompanied by a flame over the charge and a bubbling of the charge. At about 900°C, the volume of the charge decreases considerably and substantial amounts of mossy silver can readily be seen. When the charge is heated to a temperature above the melting point of silver, for example about 1000° to about 1050°C, the solid silver formed during the reaction melts and slides beneath the liquid charge. The silver recovered from this process is shiny and smooth, which indicates that the silver has been quiescently formed. This is evidence that the silver was formed as metallic silver at temperatures below the melting point of silver and is simply melted, rather than formed, at the elevated temperatures of about 1000° to about 1050°C. Since the silver is formed below the melting point, it does not absorb oxygen to any appreciable extent from the atmosphere or from the reaction medium during the formation thereof. The undesirable phenomenon known as "spitting", which results in the rapid release of absorbed oxygen during cooling of molten silver, is not observed at all, giving further evidence that the reaction of the present invention produces solid silver below the melting point of silver.

While the precise nature of the reactions involved in the present invention is not as yet precisely understood, we have postulated that the silver salts are converted by means of the sodium carbonate to silver oxide, an unstable intermediate, which in turn decomposes reductively to produce silver metal. Using sodium carbonate as the reactant, the overall metathetical reaction can be represented by equation 1:

1. $2AgX + Na_2CO_3 \rightarrow 2Ag + CO_2\uparrow + 1/2O_2\uparrow + 2NaX$

This overall reaction is consistent with the observations of the reaction charge during the controlled heating, and while we do not wish to be bound by any theory, nevertheless the chemical pathways of this reaction may be explained in terms of equations 2 through 6 below, which represent possible reactions occurring during the heating of the charge to the temperature below the melting point of silver:

2. $2AgX + Na_2CO_3 \xrightarrow{heat} Ag_2CO_3 + 2NaX$
3. $Ag_2CO_3 \xrightarrow{heat} Ag_2O + CO_2\uparrow$
4. $Ag_2O \xrightarrow{heat} 2Ag \text{ (Silver Metal)} + \frac{1}{2}O_2\uparrow$
5. $Na_2CO_3 \xrightarrow{heat} Na_2O + CO_2\uparrow$
6. $2AgX + Na_2O \xrightarrow{heat} Ag_2O + 2NaX$ The metathetical reaction occurs when the AgX reacts with $Na_2CO_3$ according to equation 2 to form the thermally unstable $Ag_2CO_3$, which decomposes to $Ag_2O$ (eq. 3). The silver oxide formed by this reaction, or by the reaction of silver halides with sodium oxide (eq. 6), is also thermally unstable and decomposes in a reductive decomposition to give silver metal and oxygen gas (eq. 4). Because the silver metal is removed from the reaction solution in the form of solid metal, the metathetical conversion of the silver salt to silver metal is driven to completion, and indeed when the reaction is carried out at higher temperatures, such as about 800° to about 900°C, the reaction produces solid silver in quantitative yields at exceptionally high purity.

The compound to be reacted with the silver salt in the metathetical reaction may be any oxygen-containing alkali metal compound that undergoes a metathetical reaction with a silver salt, at the reaction temperatures, to form metallic silver. This compound is preferably used in stoichiometric amounts if complete conversion of silver salts to silver metal is desired, but a molar ratio of reactive compound to silver salt in the range of about 0.4:1 to about 5.0:1, preferably about 1.0:1 to about 1.2:1, may be employed. Useful compounds are the carbonates, bicarbonates, hydroxides, nitrates, sulfates, or other oxygen-containing salts of the alkali metals, such as lithium, sodium, potassium, etc. Preferred alkali metals are sodium and potassium. Sodium or potassium carbonate, sodium or potassium hydroxide, sodium or potassium nitrate, or mixtures thereof are preferred compounds to use.

There is evidence that the metathetical conversion of silver salt to metallic silver occurs at a temperature as low as 300°C, depending upon the reactants involved. Consequently, the temperature to be employed in the metathetical conversion may be within the range of from about 300°C to the melting point of silver (960.8°C). Generally, the rate of conversion of silver salt to sliver metal increases with increasing temperature, and it will therefore be preferred to operate at higher temperature ranges, such as above about 400°C.

In general, a temperature in the range of from about 400° to about 950°C will provide conversion of silver salt to silver metals. Usually, a temperature will be chosen to provide a very high conversion of silver salt to silver metal, preferably at least 90%, so that there is normally no need to operate at a higher temperature than is selected to give the desired conversion. However, in some cases, depending on the reactants, 90% conversion can be reached at a temperature of as low as about 430°C (see FIG. 2), and about 100% conversion at about 475°C (FIG. 2), and hence in such cases it would be justifiable to operate well above the 90%, or even 100%, conversion temperature in order to be able rapidly to raise the temperature at the end of the reaction to above the melting point of silver to melt the silver for recovery.

The preferred procedure when using an alkali metal carbonate to convert silver salt in the absence of silver metal is to heat the charge containing the silver salt and the alkali metal carbonate to a temperature of about 500° to about 600°C to burn off organic material and then to raise the temperature to about 800° to about 900°C, so as to convert rapidly the silver salt to metallic silver. The rate of reaction appears to level off as the temperature approaches the melting point of silver, and consequently a temperature of about 800° to about 900°C, more preferably about 850° to about 900°C, allows one to obtain high rates of reaction while minimizing the loss of silver by the vaporization of silver halide which occurs more rapidly above the melting point of silver.

The presence of silver metal in the charge may affect the preferred temperature to be used. For alkali metal carbonates about 90% conversion of silver salt to silver is obtained at about 850°C (FIG. 1) when no silver is present in the charge, but when silver is present in an amount of about 2 to about 10% or more, then 90% conversion can be obtained at lower temperatures, such as about 550°C. Selection of the desired temperature for a specific reaction system can readily be effected by plotting per cent conversion versus temperature, as in FIGS. 1 and 2, for that system. It is presently preferred to operate at a temperature of about 800° to 950°C when using an alkali metal carbonate to convert a silver salt with no silver present, and a temperature of at least about 550°C, such as about 550° to about 650°C, when silver is present in the charge. When using an alkali metal hydroxide, with no silver present, at least about 90% conversion is obtained with a temperature of about 475° to about 600°C, but a temperature of about 550° to about 650°C is preferred when silver is present. Alkali metal nitrates give good results when silver is in the charge with a temperature in the range of about 675° to about 875°C, with at least about 90% conversion being obtained.

Generally, the time for the entire reaction to go to completion, i.e. to form metallic silver, is not critical, but is dependent on the mass involved, the configuration of the reaction vessel and the method of heating. There is nothing to be gained by continuing the heating after all silver salts have been converted to metallic silver. Usually a period of time of at least about ½ hour will give at least about 90% metathetical conversion of silver salts to metallic silver once any organic materials have been burned off, and generally a reaction time of about ½ to about 2 hours will be suitable.

The intimate mixture of the silver salts with the reaction materials prior to the burning of the organic material in the charge greatly enhances the unit operations of the process. Intimate mixing prior to reacting also distributes the reactants homogeneously and lowers the respective melting points, thereby promoting the metathetical conversion at a lower temperature.

The silver formed by the reaction is recovered by heating the reaction mass to a temperature above the melting point of silver, preferably under a flux, such as sodium carbonate, sodium halide or the like. Temperatures in the range of about 961° to about 1100°C are suitable for this step. The molten silver is obtained in at least 99.4% purity.

The silver salt to be converted to metallic silver may be a halide, sulfide, sulfate, thiosulfate, or other complexes or salts of silver. A useful source of such silver salts is photographic scrap emulsion, either exposed or unexposed, with or without a film or paper base. If a film or paper base is present, the base is removed by conventional means, such as by the use of proteolytic enzymes or by heating in either strong acid or strong base.

Alternatively, the silver salts can be derived from spent photographic solutions, such as spent fixer, from which the silver salt-containing solids have been recovered by evaporation to dryness or otherwise.

Clearly, the silver salts need not be derived from photographic processes or materials, but the use of the present invention to recover silver values from photographic scrap or waste material is a highly desirable use of the invention.

Where the process of the present invention is employed to recover silver values from photographic materials, the charge stock will be a complex mixture containing silver metal, silver salts (usually halides), other metals, and organic material. In such cases, a preferred embodiment of the invention resides in treating this feed stock with a mineral acid, such as hydrochloric acid, nitric acid, sulfuric acid and the like, to digest the organic material, usually primarily gelatin. Often as much as 2 to 10% of silver metal, is present in the waste material from a plant preparing and processing photographic emulsions. This silver does not participate in the conversion reaction of the invention, but is recovered as silver metal together with the silver formed by the metathetical conversion. If the acid employed is nitric acid, then it is necessary to add halide ion to precipitate the solubilized silver metal as silver halide.

By the acid treatment, the metallic impurities are solubilized, and the gelatin and the like is digested. Thus, by simple filtration of the resulting solution, a solid material is obtained which contains the silver values and little of the metallic impurities. In addition to digesting the gelatin and solubilizing the metallic impurities, the acid also allows the solids to coagulate and facilitates the separation of the silver values from the feed stock by filtration.

The amount of the acid to be used in this pretreatment step is not critical, but it is preferred that a sufficient amount be used to accomplish all of the purposes set forth above. Generally, the acid will be used in the range of from about 2% to about 30%, preferably about 20%, by weight of feed stock. In some cases the acid digestion is not required and may be eliminated, or only a small amount of acid may be added to assist coagulation.

The present invention is illustrated by the following Examples. All parts and proportions as referred to herein and in the appended claims are by weight unless otherwise indicated.

EXAMPLE 1

100 parts of chopped film in 500 parts of water at 40° to 50°C are treated with about 0.05 parts of a proteolytic enzyme for about 1 hour. This degrades the gelatin and causes the silver salts to become separated from the film. The pieces of film are strained out of this slurry which is then caused to settle by making slightly acid with 5 parts of hydrochloric acid. The non-silver bearing liquid is decanted and the process is repeated until a slurry containing 20 to 50% or higher solids is produced. The solid is separated by filtration or centrifugation and dried.

1000 parts of this solid are mixed with 350 parts of soda ash (commercial anhydrous sodium carbonate) and 150 parts of caustic soda (sodium hydroxide) and heated at 700°C for about 1 hour or until residues have burned off. The temperature is then raised to 900°C for 15 minutes and finally to 1000°C for 5 to 10 minutes to melt the silver which analyzed 99.94% pure silver and represented a 99% yield based on analysis of the starting material.

EXAMPLE 2

Figure 1:
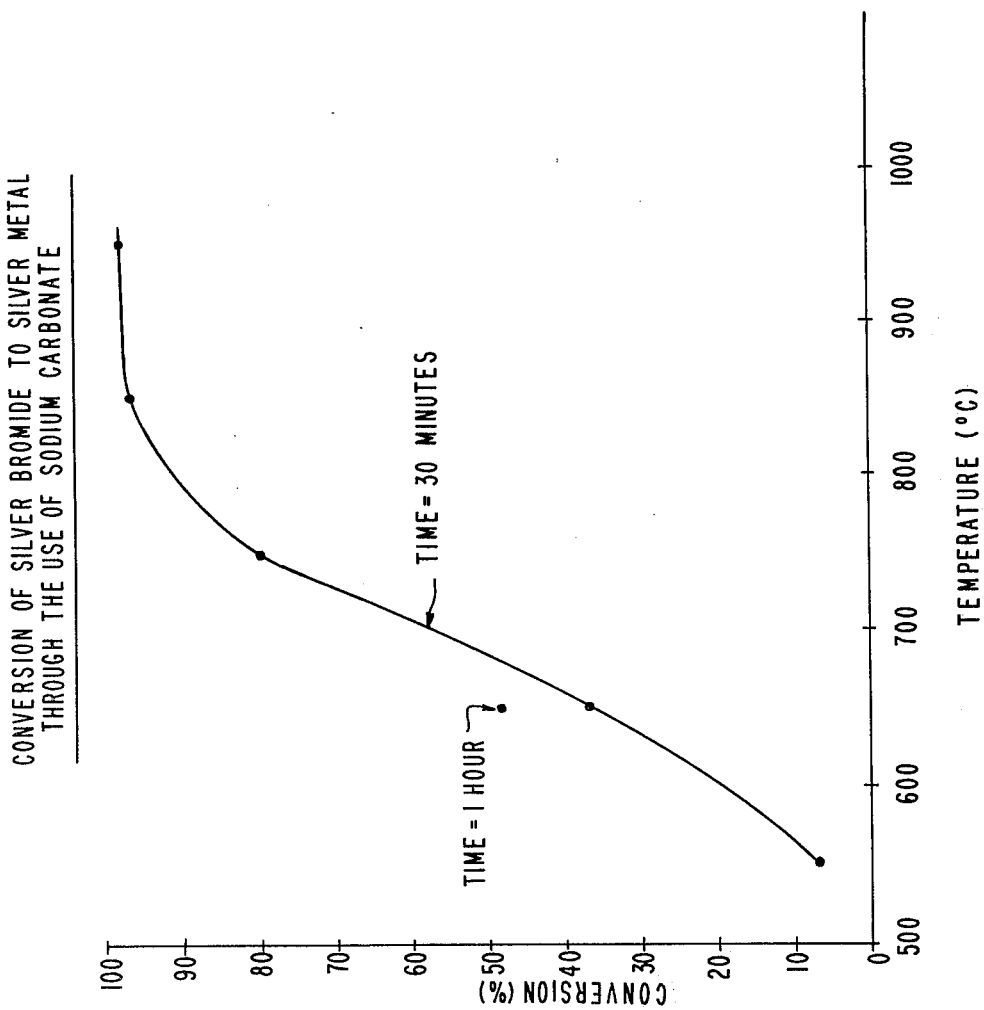

To evaluate the effect of temperature on the reduction of silver bromide (AgBr) in the presence of sodium carbonate ($Na_2CO_3$), six samples were prepared, each containing a mixture of equal amounts, by weight, of AgBr and $Na_2CO_3$. The samples were heated in a crucible at the temperature and for the period of time set forth in Table I below. The amount of silver produced in each run was determined by dissolving the product in dilute nitric acid and titrating the resulting solution potentiometrically with standard potassium chloride. The results are reported in Table I and are shown in FIG. 1.

Table I

| Sample | Temp. (°C) | Time (Min.) | Conversion of AgBr to Ag (%) |
| --- | --- | --- | --- |
| 1 | 550 | 30 | 6.8 |
| 2 | 650 | 30 | 36.9 |
| 3 | 750 | 30 | 80.2 |
| 4 | 850 | 30 | 97.6 |
| 5 | 950 | 30 | 98.0 |
| 6 | 650 | 60 | 48.6 |

A small amount of reduction took place at 550°C which is well above the melting point of AgBr. The amount of reduction increased rapidly with increasing temperature. At 850°C (about the melting point of $Na_2CO_3$), about 98% of the AgBr was reduced to metallic silver. Above 850°C, the increase in yield is negligible. Even at 950°C (sample 5), which is slightly below the melting point of metallic silver, there is no significant increase in yield as compared to 850°C.

The yields of Samples 4 and 5 being less than 100% is most likely due to a small inherent error in the analytical procedure, but could also be due to incomplete conversion.

The reduction was also carried out at 650°C with the reduction time increased to 1 hour (Sample 6). The degree of reduction increased from 37% (Sample 2) to about 48% (Sample 6). This non-linear increase in yield may be due to the non-homogeneous nature of the melted AgX coating the solid $Na_2CO_3$.

EXAMPLE 3

Following the procedure of Example 2, four samples each of a mixture of 20g of AgBr and 12.7g of NaOH are heated for 30 minutes at the temperatures set forth in Table II below. The conversion of silver bromide to metallic silver is reported in Table II and shown in FIG. 2.

As in the case of Example 2, there is rapid conversion of silver salt to metallic silver at a temperature below the melting point of silver, but the use of NaOH enables virtually quantitative yields at temperatures as low as 475°C, or just above the melting point (434°C) of silver bromide.

Table II

| Sample | Temp. (°C) | Conversion of AgBr to Ag (%) |
|---|---|---|
| 1 | 325 | 3 |
| 2 | 375 | 8 |
| 3 | 425 | 83 |
| 4 | 475 | 99 |

EXAMPLE 4

One thousand parts of the solid obtained from chopped film as in Example 1 are mixed with 500 parts of soda ash and heated to 600° to 700°C for about 2 hours. The temperature is then raised to about 900°C and held for 15 to 30 minutes to complete the formation of silver metal. Finally, the temperature is raised to 1050°C whereupon the silver melts and can be poured into ingots of 99.9% purity in a 99% yield.

EXAMPLE 5

One hundred parts of the solid obtained in Example 1 are mixed with 50 parts of soda ash and 20 parts of sodium nitrate and heated at a rate of about 7 degrees per minute. There is much smoke but no flame until a temperature of about 700°C is reached. Heating is continued at the same rate while the mass burns gently until the flaming ceases at about 975°C. Heating is further continued to 1050°C and held for about 30 minutes to melt the silver. The molten silver is then poured into an ingot.

EXAMPLE 6

Twelve hundred parts of the solid obtained from chopped photographic films and photographic emulsion residues prepared as in Example 1 are ignited in an oven at 700°C. Since the organic materials are burned off in this pretreatment, the subsequent conversion of the silver salts can be accomplished more quickly. Further, because the bulk of the solids has been reduced by about 20%, the charge to the furnace contains more of the silver-bearing material.

After the pre-ignition, one thousand parts of the resulting solid are mixed with 600 parts of anhydrous sodium carbonate and 300 parts of sodium nitrate and heated rapidly to about 950°C during about 90 minutes. After holding at 950°C for about 20 minutes, the temperature of the charge is quickly raised to about 1060°C and the resulting molten silver is poured into ingots of high purity in 99.08% yield. Under these conditions, there is some smoking but no flaming during the reaction in the furnace.

What is claimed is:

1. A method of converting a silver salt to metallic silver, which comprises heating, to a temperature of at least about 300°C but below the melting point of silver, an admixture comprising a silver salt and an oxygen-containing alkali metal compound that will react with said silver salt at said temperature to form silver metal, for a period of time at least sufficient to convert said silver salt to metallic silver, said temperature being sufficient to initiate said conversion.

2. The method according to claim 1, wherein said heating at said temperature is for at least about 30 minutes.

3. The method according to claim 1, wherein said heating at said temperature is for a period of time sufficient to convert at least about 90% of said silver salt to metallic silver.

4. The method according to claim 1, wherein said temperature is about 400° to about 950°C.

5. The method according to claim 1, wherein the molar ratio of said alkali metal compound to said silver salt is from about 0.4:1 to about 5.0:1.

6. The method according to claim 1, wherein said silver salt is selected from the group consisting of a silver halide, sulfide, sulfate, and thiosulfate, and a mixture of two or more thereof.

7. The method according to claim 6, wherein said silver salt is a silver halide or a mixture of silver halides.

8. The method according to claim 1, wherein said alkali metal compound is selected from the group consisting of an alkali metal carbonate, bicarbonate, hydroxide, nitrate, and sulfate and a mixture of two or more thereof.

9. The method according to claim 8, wherein said alkali metal compound is an alkali metal carbonate.

10. The method according to claim 8, wherein said alkali metal compound is an alkali metal hydroxide.

11. The method according to claim 8, wherein said alkali metal compound is a mixture of an alkali metal carbonate and an alkali metal hydroxide.

12. The method according to claim 8, wherein said alkali metal compound is an alkali metal nitrate.

13. The method according to claim 8, wherein said alkali metal compound is a mixture of an alkali metal carbonate and an alkali metal nitrate.

14. The method according to claim 1, wherein said metallic silver thus formed is melted by heating the reaction mixture above the melting point of silver, and molten silver is separated from the reaction mass.

15. A method of recovering silver metal from photographic waste material comprising at least one silver salt, which comprises heating the waste material to a temperature of at least about 300°C but below the melting point of silver, in admixture with an oxygen-containing alkali metal compound that will react with said silver salt at said temperature to form silver metal, for a period of time at least sufficient to convert said silver salt to metallic silver, said temperature being sufficient to initiate said conversion.

16. The method according to claim 15, wherein said waste material comprises gelatin, and said waste material is pretreated prior to said heating by reacting the waste material with an acid in an amount to degrade at least a substantial portion of said gelatin.

17. The method according to claim 16, wherein said acid is in an amount of from about 2% to about 30% by weight of said waste material.

18. The method according to claim 17, wherein the waste material is filtered after said acid pretreatment, and the solids thus obtained are subjected to said heating step.

19. The method according to claim 17, wherein the waste material is filtered after said acid pretreatment, and the solids thus obtained are ignited at an elevated temperature below the melting point of silver to burn off organic material in the solids prior to subjecting the solids to said heating.

20. The method according to claim 17, wherein the waste material is filtered after said acid pretreatment, and the solids thus obtained are admixed with said alkali metal compound, the admixture thus obtained being first ignited at an elevated temperature below the melting point of silver to burn off organic material in the solids and then the remaining admixture is subjected to said heating.

21. The method according to claim 15, wherein said waste material comprises photographic silver halide emulsion.

22. The method according to claim 15, wherein said waste material comprises a waste solution obtained from the manufacture or processing of photographic materials.

23. The method according to claim 22, wherein said waste solution is a spent fixing bath or a wash liquid.

24. The method according to claim 15, wherein said heating at said temperature is for at least about 30 minutes.

25. The method according to claim 15, wherein said heating at said temperature is for a period of time sufficient to convert at least about 90% of said silver salt to metallic silver.

26. The method according to claim 15, wherein said temperature is about 400° to about 950°C.

27. The method according to claim 15, wherein the molar ratio of said alkali metal compound to said silver salt is from about 0.4:1 to about 5.0:1.

28. The method according to claim 15, wherein said silver salt is selected from the group consisting of a silver halide, sulfide, sulfate, and thiosulfate, and a mixture of two or more thereof.

29. The method according to claim 15, wherein said alkali metal compound is selected from the group consisting of an alkali metal carbonate, bicarbonate, hydroxide, nitrate, and sulfate and a mixture of two or more thereof.

30. The method according to claim 15, wherein said metallic silver thus formed is melted by heating the reaction mixture above the melting point of silver, and molten silver is separated from the reaction mass.

* * * * *